(12) United States Patent
Fredman (10) Patent No.: US 7,380,707 B1
(45) Date of Patent: Jun. 3, 2008

(54) METHOD AND SYSTEM FOR CREDIT CARD REIMBURSEMENTS FOR HEALTH CARE TRANSACTIONS

(75) Inventor: Marc Lawrence Fredman, Chicago, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 418 days.

(21) Appl. No.: 11/065,029

(22) Filed: Feb. 25, 2005

Related U.S. Application Data (60) Provisional application No. 60/547,074, filed on Feb. 25, 2004.

(51) Int. Cl.
*G07F 19/00* (2006.01)

(52) U.S. Cl. .................... 235/379; 235/375

(58) Field of Classification Search ................ 235/379, 235/375
See application file for complete search history.

(56) References Cited

U.S. PATENT DOCUMENTS

| | | |
|---|---|---|
| 3,653,480 A | 4/1972 | Yamamoto et al. |
| 4,205,780 A | 6/1980 | Burns et al. |
| 4,321,672 A | 3/1982 | Braun et al. |
| 4,396,985 A | 8/1983 | Ohara |
| 4,495,018 A | 1/1985 | Vohrer |
| 4,617,457 A | 10/1986 | Myers |
| 4,672,377 A | 6/1987 | Murphy |
| 4,700,055 A | 10/1987 | Kashkashian, Jr. |
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,931,793 A | 6/1990 | Fuhrmann et al. |
| 4,948,174 A | 8/1990 | Thomson et al. |
| 4,974,878 A | 12/1990 | Josephson |
| 4,988,849 A | 1/1991 | Sasaki |
| 4,992,646 A | 2/1991 | Collin |

(Continued)

FOREIGN PATENT DOCUMENTS

| EP | 0099999 | 7/1983 |
|---|---|---|

(Continued)

OTHER PUBLICATIONS

Annual Report Pursuant to Sectin 13 or 15(d) of The Securities Exchange Act of 1934, Form 10-K, Intelidata Technologies Corporation, Fiscal Year Ended Dec. 31, 2001.

(Continued)

*Primary Examiner*—Karl D. Frech
(74) *Attorney, Agent, or Firm*—Hunton & Williams LLP (57) ABSTRACT

According to one embodiment, the present invention relates to a method and a system for reimbursing credit card transactions for health care services and/or products. An exemplary method and system may involve registering a user for reimbursement wherein the user identifies one or more payment mechanisms and one or more reimbursement methods; identifying a user transaction with the one or more payment mechanisms at a merchant wherein the user transaction comprises one or more purchases; receiving merchant data regarding the user transaction; determining reimbursement eligibility of the one or more purchases of the user transaction based at least in part on the merchant data; and reimbursing the user for eligible purchases via the one or more reimbursement methods.

43 Claims, 4 Drawing Sheets

U.S. PATENT DOCUMENTS

| | | | |
|---|---|---|---|
| 5,023,904 | A | 6/1991 | Kaplan |
| 5,053,607 | A | 10/1991 | Carlson |
| 5,054,096 | A | 10/1991 | Beizer |
| 5,080,748 | A | 1/1992 | Bonomi |
| 5,111,395 | A | 5/1992 | Smith |
| 5,121,945 | A | 6/1992 | Thomson et al. |
| 5,122,950 | A | 6/1992 | Mee |
| 5,136,502 | A | 8/1992 | Van Remortel et al. |
| 5,175,682 | A | 12/1992 | Higashiyama |
| 5,198,975 | A | 3/1993 | Baker et al. |
| 5,220,501 | A | 6/1993 | Lawlor |
| 5,225,978 | A | 7/1993 | Peterson |
| 5,237,159 | A | 8/1993 | Stephens |
| 5,283,829 | A | 2/1994 | Anderson |
| 5,287,269 | A | 2/1994 | Dorrough et al. |
| 5,311,594 | A | 5/1994 | Penzias |
| 5,315,508 | A | 5/1994 | Bain et al. |
| 5,321,238 | A | 6/1994 | Watanabe |
| 5,326,959 | A | 7/1994 | Perazza |
| 5,336,870 | A | 8/1994 | Hughes |
| 5,350,906 | A | 9/1994 | Brody et al. |
| 5,367,581 | A | 11/1994 | VanHorn |
| 5,373,550 | A | 12/1994 | Campbell |
| 5,396,417 | A | 3/1995 | Burks |
| 5,402,474 | A | 3/1995 | Miller |
| 5,412,190 | A | 5/1995 | Kopesec |
| 5,424,938 | A | 6/1995 | Wagner |
| 5,430,644 | A | 7/1995 | Deaton et al. |
| 5,432,506 | A | 7/1995 | Chapman |
| 5,444,794 | A | 8/1995 | Uhland |
| 5,444,841 | A | 8/1995 | Glaser et al. |
| 5,446,740 | A | 8/1995 | Yien |
| 5,448,471 | A | 9/1995 | Deaton et al. |
| 5,465,206 | A | 11/1995 | Hilt et al. |
| 5,477,040 | A | 12/1995 | Lalonde |
| 5,479,494 | A | 12/1995 | Clitherow |
| 5,483,445 | A | 1/1996 | Pickering |
| 5,484,988 | A | 1/1996 | Hills |
| 5,502,576 | A | 3/1996 | Ramsay et al. |
| 5,504,677 | A | 4/1996 | Pollin |
| 5,506,691 | A | 4/1996 | Bednar et al. |
| 5,513,250 | A | 4/1996 | McAllister |
| 5,532,464 | A | 7/1996 | Josephson et al. |
| 5,544,046 | A | 8/1996 | Niwa |
| 5,550,734 | A | 8/1996 | Tater |
| 5,551,021 | A | 8/1996 | Harada |
| 5,557,515 | A | 9/1996 | Abbruzzese et al. |
| 5,563,400 | A | 10/1996 | Le Roux |
| 5,566,330 | A | 10/1996 | Sheffield |
| 5,568,489 | A | 10/1996 | Yien |
| 5,570,465 | A | 10/1996 | Tsakanikas |
| 5,572,004 | A | 11/1996 | Raimann |
| 5,583,759 | A | 12/1996 | Geer |
| 5,583,760 | A | 12/1996 | Klesse |
| 5,590,196 | A | 12/1996 | Moreau |
| 5,590,197 | A | 12/1996 | Chen |
| 5,592,377 | A | 1/1997 | Lipkin |
| 5,592,378 | A | 1/1997 | Cameron |
| 5,599,528 | A | 2/1997 | Igaki |
| 5,603,025 | A | 2/1997 | Tabb |
| 5,615,109 | A | 3/1997 | Eder |
| 5,621,201 | A | 4/1997 | Langhans |
| 5,640,577 | A | 6/1997 | Scharmer |
| 5,642,419 | A | 6/1997 | Rosen |
| 5,649,117 | A | 7/1997 | Landry |
| 5,652,786 | A | 7/1997 | Rogers |
| 5,659,165 | A | 8/1997 | Jennings |
| 5,659,469 | A | 8/1997 | Deaton et al. |
| 5,659,741 | A | 8/1997 | Eberhardt |
| 5,666,493 | A | 9/1997 | Wojcik et al. |
| 5,677,955 | A | 10/1997 | Doggett et al. |
| 5,679,938 | A | 10/1997 | Templeton |
| 5,679,940 | A | 10/1997 | Templeton |
| 5,692,132 | A | 11/1997 | Hogan |
| 5,699,528 | A | 12/1997 | Hogan |
| 5,703,344 | A | 12/1997 | Bezy et al. |
| 5,704,044 | A | 12/1997 | Tarter et al. |
| 5,708,422 | A | 1/1998 | Blonder et al. |
| 5,715,298 | A | 2/1998 | Rogers |
| 5,715,314 | A | 2/1998 | Payne |
| 5,715,399 | A | 2/1998 | Bezos |
| 5,717,989 | A | 2/1998 | Tozzoli et al. |
| 5,724,424 | A | 3/1998 | Gifford |
| 5,727,249 | A | 3/1998 | Powell |
| 5,748,780 | A | 5/1998 | Stolfo |
| 5,751,842 | A | 5/1998 | Eccles |
| 5,757,917 | A | 5/1998 | Rose et al. |
| 5,770,843 | A | 6/1998 | Rose et al. |
| 5,774,553 | A | 6/1998 | Rosen |
| 5,784,696 | A | 7/1998 | Melnikoff |
| 5,793,861 | A | 8/1998 | Haigh |
| 5,794,221 | A | 8/1998 | Egendorf |
| 5,802,498 | A | 9/1998 | Comesanas |
| 5,802,499 | A | 9/1998 | Sampson et al. |
| 5,819,236 | A | 10/1998 | Josephson |
| 5,819,238 | A | 10/1998 | Fernholz |
| 5,826,241 | A | 10/1998 | Stein |
| 5,826,245 | A | 10/1998 | Sandberg-Diment |
| 5,832,447 | A | 11/1998 | Rieker |
| 5,832,460 | A | 11/1998 | Bednar |
| 5,832,463 | A | 11/1998 | Houvener et al. |
| 5,832,464 | A | 11/1998 | Houvener et al. |
| 5,832,488 | A | 11/1998 | Eberhardt |
| 5,835,580 | A | 11/1998 | Fraser |
| 5,835,603 | A | 11/1998 | Coutts |
| 5,835,899 | A | 11/1998 | Rose et al. |
| 5,852,812 | A | 12/1998 | Reeder |
| 5,859,419 | A | 1/1999 | Wynn |
| 5,864,609 | A | 1/1999 | Cross et al. |
| 5,870,456 | A | 2/1999 | Rogers |
| 5,870,721 | A | 2/1999 | Norris |
| 5,870,723 | A | 2/1999 | Pare |
| 5,870,725 | A | 2/1999 | Bellinger et al. |
| 5,873,072 | A | 2/1999 | Kight |
| 5,883,810 | A | 3/1999 | Franklin et al. |
| 5,884,288 | A | 3/1999 | Chang |
| 5,897,625 | A | 4/1999 | Gustin |
| 5,898,157 | A | 4/1999 | Mangili et al. |
| 5,903,881 | A | 5/1999 | Schrader |
| 5,910,896 | A | 6/1999 | Hahn-Carlson |
| 5,910,988 | A | 6/1999 | Ballard |
| 5,917,965 | A | 6/1999 | Cahill et al. |
| 5,920,847 | A | 7/1999 | Kolling et al. |
| 5,930,778 | A | 7/1999 | Geer |
| 5,940,811 | A | 8/1999 | Norris |
| 5,940,844 | A | 8/1999 | Cahill et al. |
| 5,943,656 | A | 8/1999 | Crooks |
| 5,945,653 | A | 8/1999 | Walker et al. |
| 5,956,700 | A | 9/1999 | Landry |
| 5,963,659 | A | 10/1999 | Cahill et al. |
| 5,963,925 | A | 10/1999 | Kolling et al. |
| 5,966,698 | A | 10/1999 | Pollin |
| 5,978,780 | A | 11/1999 | Watson |
| 5,987,435 | A | 11/1999 | Weiss et al. |
| 5,987,436 | A | 11/1999 | Halbrook |
| 5,987,439 | A | 11/1999 | Gustin et al. |
| 5,991,750 | A | 11/1999 | Watson |
| 6,000,832 | A | 12/1999 | Franklin et al. |
| 6,003,762 | A | 12/1999 | Hayashida |
| 6,006,208 | A | 12/1999 | Forst et al. |
| 6,009,442 | A | 12/1999 | Chen et al. |
| 6,014,636 | A | 1/2000 | Reeder |
| 6,016,482 | A | 1/2000 | Molinari et al. |
| 6,032,133 | A | 2/2000 | Hilt et al. |

| | | |
|---|---|---|
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,056 A | 11/2000 | Stinson et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,227,447 B1 | 5/2001 | Campisano |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,301,379 B1 | 10/2001 | Thompson et al. |
| 6,304,858 B1 | 10/2001 | Mosler et al. |
| 6,321,212 B1 | 11/2001 | Lange |
| 6,338,047 B1 | 1/2002 | Wallman |
| 6,338,049 B1 | 1/2002 | Walker et al. |
| 6,374,235 B1 | 4/2002 | Chen et al. |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,490,568 B1 | 12/2002 | Omara et al. |
| 6,493,685 B1 | 12/2002 | Ensel et al. |
| 6,574,377 B1 | 6/2003 | Cahill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,704,714 B1 | 3/2004 | O'Leary et al. |
| 6,721,715 B2 | 4/2004 | Nemzow |
| 2001/0018739 A1 | 8/2001 | Anderson et al. |
| 2001/0037309 A1 | 11/2001 | Vrain |
| 2001/0047334 A1 | 11/2001 | Nappe et al. |
| 2001/0047489 A1 | 11/2001 | Ito et al. |
| 2002/0012445 A1 | 1/2002 | Perry |
| 2002/0013728 A1 | 1/2002 | Wilkman |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0069134 A1 | 6/2002 | Solomon |
| 2002/0077978 A1 | 6/2002 | O'Leary et al. |
| 2002/0087468 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138398 A1 | 9/2002 | Kalin et al. |
| 2002/0170966 A1 | 11/2002 | Hannigan et al. |
| 2002/0178071 A1 | 11/2002 | Walker et al. |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0046218 A1 | 3/2003 | Albanese et al. |
| 2003/0097335 A1 | 5/2003 | Muskowitz et al. |
| 2003/0105641 A1 | 6/2003 | Lewis |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2004/0078328 A1 | 4/2004 | Talbert et al. |
| 2005/0033690 A1 | 2/2005 | Antognini et al. |
| 2006/0106650 A1* | 5/2006 | Bush ............................ 705/4 |

FOREIGN PATENT DOCUMENTS

| | | |
|---|---|---|
| EP | 421808 | 4/1991 |
| EP | 1014318 | 6/2000 |
| WO | WO 94/28497 | 12/1984 |
| WO | WO 97/45796 | 4/1991 |
| WO | WO 91/16691 | 10/1991 |
| WO | WO 93/08545 | 4/1993 |
| WO | WO 96/08783 | 3/1996 |
| WO | WO 96/12242 | 4/1996 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 | 10/2001 |
| WO | WO 02/063432 A3 | 8/2002 |

OTHER PUBLICATIONS

Blockbuster running test of a stored value card, The American Banker, Sep. 1, 1995.

CESNaBANCO introduces stored value card technology blockbuster video is first merchant partner Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying By Credit Card-Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Card International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money, no date.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Payment data, www.paymentdata.com, Mar. 5, 2004.

Maher and Troutman, Payor's Prescription for Painless Migration to Electronic Healthcare Payments and Remittance Advices, PNC Bank, Dec. 2001.

Press Release, Mar. 5, 2004, Payment Data Systems Files Patent on Debit Card Payment Solution, American City Business, Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, And Fund Stars Do the Same, The Wall Street Journal, Jan. 15, 2003.

Anonymous, Visa & Carnegie Mellon Plan Online Payment Scheme, Newsbyte News Network, Feb. 15, 1995.

Financial News, Wells Fargo Rolls Out Nationwide Lockbox Check Conversion, PR Newswire Association, Apr. 22, 2003.

"Offer: Book Yourself Free Cassettes", Birmingham Post, p. 16, Mar. 25, 2000.

* cited by examiner

METHOD AND SYSTEM FOR CREDIT CARD REIMBURSEMENTS FOR HEALTH CARE TRANSACTIONS

CROSS-REFERENCE TO RELATED APPLICATIONS

The present application claims priority to U.S. Provisional Patent Application No. 60/547,074, filed Feb. 25, 2004, which is hereby incorporated by reference herein in its entirety.

FIELD OF THE INVENTION

The present invention relates generally to reimbursements for transactions and, more particularly, to a method and system for reimbursing credit card and other transactions for health care services and/or products.

BACKGROUND OF THE INVENTION

As health care expenses continue to rise, consumers are taking on a bigger role in paying and managing health care costs. This increase in consumer responsibility ranges from greater cost-sharing for medical services to having to choose among increasing health care financing options. One important tool for consumer participation in health care is the use of consumer-directed accounts. Consumer-directed accounts are dedicated funding pools used for health care expenses at the discretion of an individual. These accounts can be procured either individually or through an employer, and may or may not involve tax advantages to the user of the account. A key requirement in the use of consumer-directed accounts is that they finance only those goods and services that are authorized by the Internal Revenue Service (IRS) as eligible medical expenses. This creates the need for close oversight of consumer-directed account programs, which involves high paper volumes, manual intervention, and substantial administrative expense to ensure compliance. In addition, the current process often requires participants to pay for goods and services and then file for reimbursement out of the funds contributed to the consumer-directed account. This requires participants to make the payment up-front even though the funds may have already been set aside and to handle a variety of paper documents during filing and reimbursement. These challenges significantly undermine the efficiency of consumer-directed account programs, resulting in dissatisfied participants and program sponsors. Given these difficulties, there is a clear need for an electronic solution that automates the administration and use of consumer-directed accounts, while maintaining compliance with the rules and regulations under which consumer-directed accounts are governed.

The trend to consumer-directed health care has been supported by three major legislative innovations within the past thirty years; namely, the Revenue Act of 1978, the Health Insurance Portability and Accountability Act of 1996 (HIPAA) and a ruling in 2002 by the IRS establishing Health Reimbursement Arrangements. Each of these initiatives created the model for a consumer-directed account in use today. The Revenue Act of 1978 created Flexible Spending Accounts (FSA), which are employer-sponsored accounts funded by employees' pre-tax contributions from payroll. Flexible Spending Accounts can be established and used for a variety of purposes, such as the payment of health care, dependent care, or public transportation expenses. Because Flexible Spending Accounts are funded with pre-tax dollars, participants in an FSA program can realize substantial savings on eligible expenses. Employers value FSA programs because these accounts provide benefits to employees and reduce employees' taxable income on which an employer must pay Federal Insurance Contributions Act (FICA) taxes. Currently, there are more than 8 million Health Flexible Spending Accounts in the US, with over 9 billion dollars in annual contributions. Health FSA contributions are expected to grow significantly over the next several years, as consumers take on more of the burden for health care costs and seek tax-advantaged tools to finance those expenses.

Two other types of consumer-directed accounts—the Medical Savings Account (MSA) and the Health Reimbursement Arrangement (HRA)—were introduced within the past decade. The MSA was established with the passage of HIPAA in 1996. The MSA provides for a tax-advantaged account reserved for individuals who are self-employed or employed at a small business, and who use a qualifying high-deductible health plan. The MSA is designed to provide tax benefits on payments towards a deductible portion of a high-deductible health plan. A key advantage of the MSA to participants is the ability to carry over unused funds in the account from one plan year to the next. This differs from FSA programs that require unused funds to be forfeited by the employee and turned over to the employer health plan, a requirement commonly known as the FSA "use it or lose it" provision. The IRS established the HRA in June 2002, drawing on the strengths of both the FSA and the MSA. For example, employers of all sizes may implement an HRA program (e.g., FSA). In addition, unused funds contributed to an HRA may roll over from one plan year to the next, like MSA. Due to its flexibility and attractiveness to employees, the HRA is expected to quickly become prevalent throughout the employee benefits marketplace.

A result of these initiatives is the proliferation of consumer-directed accounts used to provide tax advantages for health care spending. Although FSA, MSA, and HRA are the most common forms of consumer-directed accounts, others may also exist. As consumer-directed health care evolves, there will be continued innovation in the field of consumer-directed accounts. This will likely result in new account structures being introduced over time.

Because consumer-directed accounts are legal structures, there are a wide variety of associated rules and regulations. Some important rules include provisions on the types of expenses that can be financed through a consumer-directed account, as determined by the IRS. In general, consumer-directed accounts can only pay for expenses that are medically necessary (such as prescription eye care, prescription drugs, hearing devices, or any other medically necessary expenses), whereas expenses that are not medically necessary (typically "cosmetic" goods and services such as non-prescription sunglasses, cosmetic surgery, or any other non-medically necessary expenses) are deemed ineligible. Because consumer-directed accounts confer tax advantages to participants, the IRS requires strict compliance from employers and their agents to ensure that only eligible medical expenses are financed through a consumer-directed account. If ineligible medical expenses are paid for through a consumer-directed account, tax advantages are being made available inappropriately. As a result, the IRS can assign and enforce penalties for non-compliance.

Most consumer-directed accounts offered through an employer benefits plan are managed and administered by an entity other than the employer itself, usually a Third Party Administrator (TPA). A TPA can provide a variety of services to employers, such as managing claim submissions from employees and generating reports on plan usage. The requirements to comply with IRS guidelines for expense eligibility create a heavy burden on the TPA in managing a consumer-directed account program. Whenever an employee files for reimbursement out of a consumer-directed account, the TPA must audit and validate the claim to ensure that it is for a valid medical expense. Typically, the employee will provide proof of eligibility in the form of a paper receipt or invoice documenting the nature of the expense, which the TPA reviews to confirm compliance. This validation process is extremely labor-intensive and generally requires TPA personnel to review a given claim manually. Further complicating the TPA's task of ensuring compliance is the ability of employers to customize expense eligibility rules to their particular program. That is, although the IRS governs what is potentially allowed, employers have the option to limit further the specific types of expenses that their particular consumer-directed account program will authorize. A TPA must therefore consult the plan rules for a given program before granting approval to an employee's claim. After the claim has been deemed eligible and sufficient funds have been confirmed within the employee's consumer-directed account, the TPA will remit funds, usually by paper check, with a paper explanation of payment to the employee.

Because of the challenges associated with the current manual processing and administration of consumer-directed accounts, industry participants have attempted to develop a variety of mechanisms to streamline activities and improve automation. As consumer-directed accounts grow in importance and usage, these efforts will become increasingly relevant to the ways in which health care expenses are paid and managed.

Efforts to innovate within the administration and use of consumer-directed accounts have historically proceeded in two key ways. First, many Third Party Administrators have attempted to manage the existing paper process better without actually reducing the submissions of paper claim forms. An example of this type of innovation is the use of scanning and character-recognition technology to store an electronic copy of paper claims as they are received and to adjudicate claims based on the information contained in the electronic image. Using this type of technology reduces the amount of paper that a TPA has to keep on file and enables better management of claim documents than if such documents were to remain in paper form. Although this approach may realize certain cost savings, the key problems associated with the current process for managing consumer-directed accounts still remain. That is, participants still have to prepare and file paper claims and front payment for goods and services, and Third Party Administrators must still handle paper documents and manually review the expense eligibility of submitted claims.

The second way industry participants have sought to improve the administration and use of consumer-directed accounts is to attempt to reduce the number of paper claim forms submitted by participants. Manual mechanisms for obviating claim form submission have existed for several years. For example, in some cases, a TPA may be able to make a direct payment from a consumer-directed account to a provider of eligible goods or services without the participant having to file a claim form or initiate a payment. This method is usually applied for payments that are recurring in nature (such as elder care or regular prescription drug purchases), because it requires notifying the provider to change their process and forward an invoice for payment to the TPA directly rather than to the employee. In addition, such payments are only possible when payment is not required at the time services are rendered. For prescription drug transactions within a pharmacy, for example, payment is expected at the point of sale, precluding a post-hoc payment from the TPA to the provider. Moreover, although the participant does not have to file a paper claim form, the TPA must still employ a manual process for adjudicating and paying claims.

Another manual mechanism for reducing the number of paper claim submissions by savings account participants is to automatically apply consumer-directed account funds towards deductibles or co-payments determined under an employer-sponsored health plan. This option has historically been possible only when the TPA manages claims for both the consumer-directed account and the health plan for a given employer. In this scenario, an employee obtains goods or services from a medical provider, causing the provider to generate and submit a claim to the employee's health plan. Once the TPA has adjudicated the claim and determined the employee's payment responsibility, the TPA remits funds from the consumer-directed account directly to the provider, eliminating the need for the employee to pay the provider up-front and then prepare and file a claim with the TPA for reimbursement from the consumer-directed account. However, instances when an individual TPA manages both the consumer-directed accounts and the health plan for a given employer are limited, making this option available to relatively few consumer-directed account participants.

An alternative mechanism for reducing paper claims submissions and improving efficiencies involves enabling electronic claim submission and payment through the use of a stored value program. A stored value program typically includes supplying each participant with a payment card that is linked to a consumer-directed account. A participant then presents the physical card or the card number for payment wherever medical expenses are incurred. The health care provider initiates a payment transaction, that transfers funds from the consumer-directed account to the provider's bank account, eliminating the need for the participant to provide up-front payment and then file for later reimbursement through the TPA. Likewise, the TPA benefits by not having to manage and process paper forms and claims associated with the card-initiated transaction. Because of the wide acceptance of payment cards, participants are able to use consumer-directed account funds in a variety of venues, such as in a retail location, through the mail, or over the phone and other types of transactions.

In stored value arrangements, payments are made directly from the FSA without being substantiated first as eligible expenses. This forces the TPA to solicit receipts from the employee and make restitution to the FSA for non-compliant claims. Often, the employee is lax with submission and sometimes may fail to submit receipts at all.

Although stored value programs have the potential to create substantial efficiencies and benefits, they also have the potential for substantial abuse. In particular, current programs risk exposing employers and Third Party Administrators to non-compliance with IRS guidelines for consumer-directed account expense eligibility. Unlike the current manual process that allows a TPA to audit detailed transaction information in the form of a submitted receipt, card transactions generally communicate only the payment amount requested and the type of merchant that is initiating the transaction (e.g., a pharmacy, a toy store, etc.). Many stored value programs thus authorize the use of card payments to merchants that are considered "health care providers" (such as doctors, optometrists, pharmacies, etc.) and deny card transactions at non-health care merchants (such as a toy store or apparel retailer). This type of filtering is inadequate because many putative health care merchants may still sell goods or services that do not meet the IRS guidelines for payment from a consumer-directed account. For example, a consumer-directed account participant receiving services from a physician's office may be receiving cosmetic enhancements that are not medically necessary. Alternatively, a participant may present their card at a pharmacy for payment toward a wide variety of non-eligible goods (e.g., magazines, office supplies, etc.). Unless a stored value program analyzes detailed, individual transaction data to determine expense eligibility, ineligible expenses may be inappropriately authorized and funded by the consumer-directed account.

Because of the risk of non-compliance associated with card programs, many Third Party Administrators review card transactions post-payment and audit them for inappropriate activity. According to IRS guidelines, claims do not need to be confirmed as eligible expenses prior to payment as long as 100% of all claims are reviewed post-payment. In cases where expenses paid by a consumer-directed account are later deemed ineligible, participants must be made to restore misappropriated funds to the savings account, forcing the TPA into the costly and awkward role of collections officer. Due to the risk of fraudulent payment, a TPA may even require that a participant substantiate every card transaction with paper documentation, which then fails to relieve employees and Third-Party Administrators of the traditional challenges associated with participating in and managing a consumer-directed account. Frequent TPA audits and collection activities can significantly undermine the efficiencies that stored value programs were designed to achieve.

Because the IRS has the ability to levy substantial fines for non-compliance, many employers are unwilling to accept the risks associated with current stored value programs, opting instead for the less efficient but potentially more compliant traditional, manual process.

SUMMARY OF THE INVENTION

According to an embodiment of the present invention, a method and system facilitates the reimbursement of eligible transactions, such as health care transactions.

According to an exemplary embodiment of the present invention, a computer implemented method for facilitating reimbursements for eligible transactions comprising the steps of registering a user for reimbursement wherein the user identifies one or more payment mechanisms and one or more reimbursement methods; identifying a user transaction with the one or more payment mechanisms at a merchant wherein the user transaction comprises one or more purchases; receiving merchant data regarding the user transaction; determining reimbursement eligibility of the one or more purchases of the user transaction based at least in part on the merchant data; and reimbursing the user for eligible purchases via the one or more reimbursement methods.

In accordance with other aspects of this exemplary embodiment of the present invention, the payment mechanism comprises one or more of a credit card, debit card and token; the reimbursement method comprises an electronic deposit in an account; the reimbursement method comprises credit against an credit card balance; the reimbursement method comprises deposit in an investment account; the merchant data comprises line item data of the user transaction; the step of determining eligibility comprises applying a filter to the merchant data; the filter comprises one or more IRS guidelines; the filter comprises additional one or more employer specified guidelines; the user transaction comprises ineligible and eligible purchases; the ineligible purchases are applied to a payment channel associated with the payment mechanism; reimbursement is made from a consumer-directed account; the consumer-directed account comprises a Flexible Spending Account associated with the participant wherein the participant designates a predetermined amount of pre-taxed dollars to be deducted from the participant's paycheck and contributed to the participant's consumer-directed account; the consumer-directed account comprises a Medical Savings Account associated with the participant; the consumer-directed account comprises a Health Reimbursement Arrangement account associated with the participant.

According to another exemplary embodiment of the present invention, a computer implemented method for facilitating reimbursements for eligible transactions comprises the steps of: identifying one or more payment mechanisms with a computer implemented reimbursement system; identifying one or more reimbursement methods with the computer implemented reimbursement system; making one or more purchases at a merchant entity with the one or more identified payment mechanisms; and receiving reimbursement for eligible purchases via the one or more reimbursement methods.

In accordance with other aspects of this exemplary embodiment of the present invention, the payment mechanism comprises one or more of a credit card, debit card and token; the reimbursement method comprises one or more of an electronic deposit in an account, credit against an credit card balance and deposit in an investment account; ineligible purchases are applied to a payment channel associated with the payment mechanism; reimbursement is made from a consumer-directed account.

According to another exemplary embodiment of the present invention, a computer implemented system for facilitating reimbursements for eligible transactions comprises: register module for registering a user for reimbursement wherein the user identifies one or more payment mechanisms and one or more reimbursement methods; payment module for identifying a user transaction with the one or more payment mechanisms at a merchant wherein the user transaction comprises one or more purchases and receiving merchant data regarding the user transaction; eligibility module for determining reimbursement eligibility of the one or more purchases of the user transaction based at least in part on the merchant data; and reimbursement module for reimbursing the user for eligible purchases via the one or more reimbursement methods.

According to another exemplary embodiment of the present invention, a computer implemented system for facilitating reimbursements for eligible transactions comprises: payment module for identifying one or more payment mechanisms with a computer implemented reimbursement system; and reimbursement module for identifying one or more reimbursement methods with the computer implemented reimbursement system; where the user makes one or more purchases at a merchant entity with the one or more identified payment mechanisms and receives reimbursement for eligible purchases via the one or more reimbursement methods.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

An embodiment of the present invention is directed to a method and system for facilitating reimbursements for eligible health care transactions. Health care transactions may involve various spending categories, which may include but are not limited to pharmaceuticals, co-payments (co-pays), dental expenses, eye care services, etc.

Traditional mechanisms for reimbursement require submitting paper receipts and claim forms to get reimbursed from a health care account, such as Flexible Spending Account (FSA). Other health care accounts may include Health Reimbursement Arrangements (HRAs), Medical Savings Accounts (MSAs), Dependent Care Flexible Spending Accounts or other consumer-directed accounts, including consumer-directed savings accounts. According to an embodiment of the present invention, a user (e.g., consumer, employee, etc.) may use a credit card (or other card product or payment mechanism) to pay for health care goods and services, where reimbursement is automatic for eligible medical expenses, such as prescription drugs, doctor's office co-pays, etc. As a result, users are not required to save or send in receipts, forms or other paperwork.

According to an embodiment of the present invention, the user may register with a reimbursement system of an embodiment of the present invention. Registration may be performed through the employer, which may include the employer's human resources department, other department or personnel. Registration may also be performed online, over the phone, through mail, in person or through other forms of communication. During registration, the user may identify a payment mechanism and reimbursement preference, e.g., how the user wants payments for qualified health care purchases reimbursed. The payment mechanism may include credit cards, debit cards, stored value cards, tokens and other types of payment. In addition, the user may direct finds to be reimbursed electronically in a designated account, such as a checking account; credited against an outstanding credit card balance; placed in an investment account to accumulate additional savings over time or other account; or other reimbursement method. Other information and/or preferences may be provided. Once the payment mechanism is registered, the user may use the registered payment mechanism at a doctor's office, pharmacy and various health care and/or other locations. Purchases may also be made at other merchants who offer eligible as well as ineligible health care products and/or services. Purchases may be made at a merchant store, online, via phone order, mail order or other method of purchasing products and/or services. Through an embodiment of the present invention, whenever the user purchases something (e.g., product, service, etc.) that is eligible for reimbursement from a participating account (e.g., Flexible Spending Account or other account), the finds will be automatically reimbursed in the manner specified. As reimbursement is made automatically, the user can avoid forfeiting unused balances in the participating account by forgetting to submit receipts and/or other paperwork.

Figure 1:
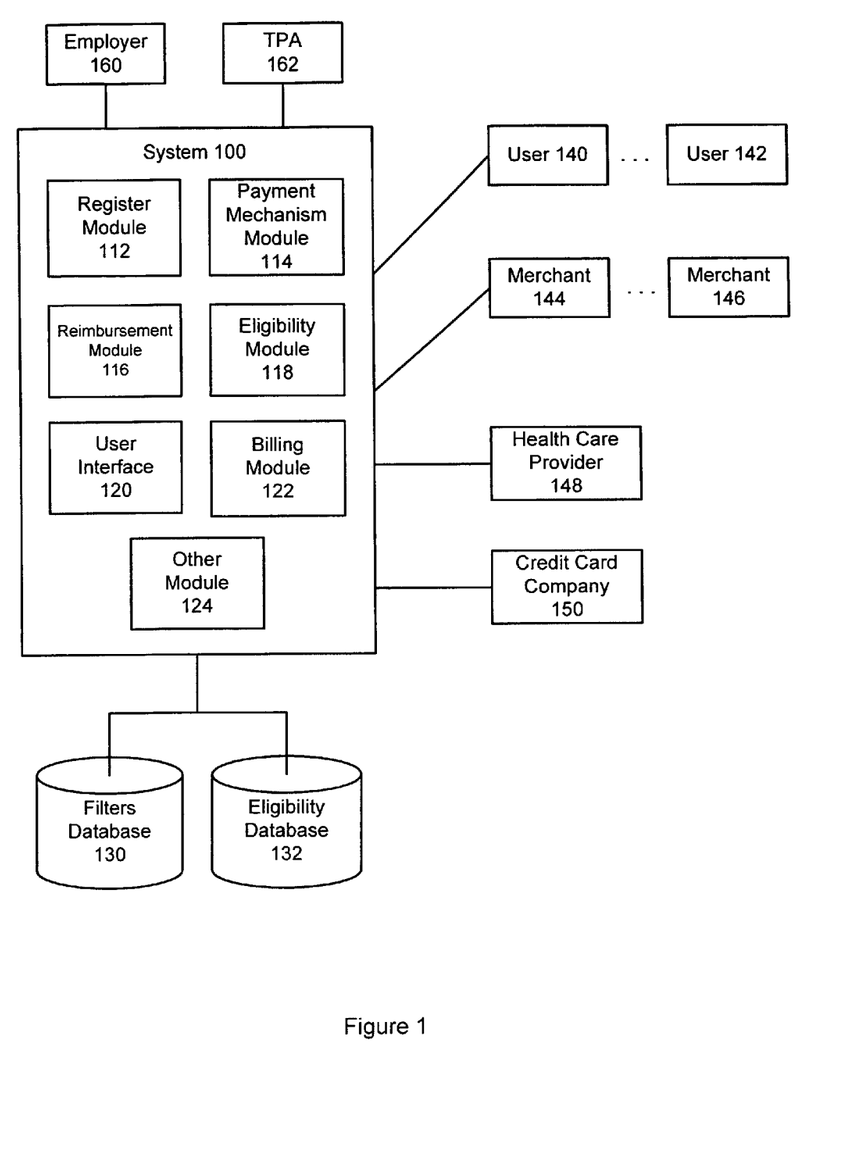
FIG. 1 is an exemplary diagram of a system for facilitating health care reimbursement, according to an embodiment of the present invention.

FIG. 1 is an exemplary diagram of a system for facilitating health care reimbursement, according to an embodiment of the present invention. User 140, 142 may represent any participant (e.g., employee, etc.) who may engage in a transaction for health care products and/or services (e.g., prescription drugs, etc.). Merchant 144, 146 may represent a retail store, a mail order facility, a website, a physician affiliated store, pharmacy or other entity providing products and/or services. Merchants may provide health care products and/or services as well as other products and/or services.

Other participants may include Health Care Provider 148, Pharmacy Benefit Manager (PBM) and/or other health care participants. The user (e.g., employee, etc.) may receive services and/or products from Health Care Provider 148. For example, a user may visit a doctor or hospital (or other health care provider) to receive treatment, advice or other services and/or products. Health Care Provider may include a physician, hospital, specialist, psychologist, physical therapist, optometrist, dentist or other provider. According to another example, PBM may manage claims from one or more pharmacies and perform claim adjudication. For example, a pharmacy may verify claim or prescription eligibility and determine a co-pay amount through PBM. More specifically, PBM may adjudicate the claim, which may involve determining whether the transaction is covered by insurance (or other entity) and the amount owed by the user (e.g., self-pay due). Self-pay due may represent the remaining balance due or the amount due by the user. For example, a user may purchase a prescription drug from a pharmacy. Based at least in part on information provided by the pharmacy, PBM may determine that the prescription drug will cost $100, where $80 will be covered by insurance and the participant will be liable for $20 (e.g., the self-pay due). Thus, PBM may determine the amount owed by the participant and payable by the participant's account (e.g., FSA, MSA, HRA or other consumer-directed account), if the claim is eligible for payment.

An embodiment of the present invention may also support various transaction environments. For example, a user may purchase one or more products and/or services through a Merchant. The user may engage in a transaction using a card or other payment mechanism. In addition, the participant may purchase the one or more products and/or services via the Internet, phone order or other point of sale by providing an identifier (e.g., account number, password, PIN, etc.) associated with a participant's payment mechanism.

System 100 provides reimbursement functionality provided by an embodiment of the present invention. System 100 may be associated with one or more employers 160, TPAs 162 and/or other entities. Employer 160 may set up an account for one or more users 140, 142, who may be associated with employer 160. The account may include various accounts, such as consumer-directed accounts, FSAs, MSAs, HRAs, etc. TPA 162 may manage the accounts for the employer or other entity. In accordance with various embodiments of the present invention, communication may be established via Internet, Ethernet, Intranet, wireless communication and/or other modes of electronic communication or other form of communication.

As shown in FIG. 1, System 100 provides reimbursement functionality in accordance with various embodiments of the present invention. Credit Card Company 150 may be separate or combined with System 100. In addition, Employer 160 may be separate or combined with System 100. Other various combinations may be implemented. System 100 may include modules for providing reimbursement functionality. Modules may include Register Module 112, Payment Mechanism Module 114, Reimbursement Module 116, Eligibility Module 118, User Interface 120, Billing Module 122 and/or other modules. The modules of System 100 may be further combined, duplicated and/or separated. In addition, the modules of System 100 may also be provided across multiple systems and/or other platforms. Other implementations may be realized.

The various modules of System 100 may access and/or store data at Databases 130, 132. In the exemplary embodiment of FIG. 1, Filters Database 130 and Eligibility Database 132 are provided. Additional databases may be implemented. Further, the databases may be consolidated into a single database or further separated. Filters Database 130 may provide various filters for identifying eligible expenses. Eligibility Database 132 may provide data (e.g., data tables, data sets, binary fields, etc.) for identifying eligible expenses. In addition, the databases may also store customer data, payee/recipient data, payment data, etc. Other data may be stored and/or accessed. Other sources of information (e.g., external and/or internal sources of data) may also be accessed by the various modules of System 100.

An embodiment of the present invention is directed to the automated matching of card transaction activity with batch data feeds from entities involved in health care and/or other transactions. The batch data feeds may include line-level information for substantiating transactions as eligible medical expenses and automating the reimbursement process. Data may be received or accessed from card-acquiring merchants, such as Walgreens™, LensCrafters™, etc., and non-merchant partners such as Pharmacy Benefit Managers (PBMs) and Insurers, as well as other entities, such as credit card companies, third parties and/or other participants. The batch data feeds may include detailed transaction information for determining whether each product and/or service is eligible for reimbursement. Based on the information received, a determination may be made as to whether each purchase is eligible for reimbursement or not. For example, the information may include type of product or service, price, purpose, product or service code, date/time of purchase, merchant data, etc.

An embodiment of the present invention may be facilitated through a data table of medical products and services. Data may be presented in other formats as well. For example, the data table may be developed for various potential health care transactions using publicly available data sets and/or other sources of data. Data sets may include Prescription drugs (NDC); Dental (CDT); Medical (CPT/ICD-9) and/or Non-prescription medical products (UPC). Other data sets may also be included. As eligible transactions may change in the future, data sets may be modified, added, deleted, etc.

According to another example, each product and service may contain a binary field for expense eligibility where eligibility may be determined by passing the product or service through one or more filters. Filters may include mandatory guidelines as well as individual imposed guidelines. While IRS guidelines may apply to most or all participants, a particular employer (or other entity) may restrict or expand reimbursement coverage for certain transactions. According to an embodiment of the present invention, data may be passed through one or more filters. For example, a first filter may include IRS guidelines (which may be common to some or all plans) and a second filter may include additional restrictions set by employers and/or TPA agents (which may be unique to particular plans). Additional filters may also be employed. According to an exemplary scenario, plan rules may be established when each employer is configured to enroll employees in the service. At that time, employers may also enable other guidelines for their plans (FSA vs. HRA draw-down priority, etc.). Other methods for identifying eligible expenses may also be implemented in accordance with the various embodiments of the present invention.

On a periodic or other basis, card activity of participating employees may be matched against substantiation partners' line-item data feeds. Adjudication may be driven by the business rules contained in the data table to guarantee compliance and facilitate the reimbursement process in an automated way.

Register Module 112 may receive registration information from a user. Registration information may include user identification information and/or contact information. Users may register directly with the system, through an employer or other department associated with the employer (e.g., human resources department), a credit card company, third party participant and/or other registration entity. Users may register in person, or via other communication methods, such as online, phone, etc. Register Module 112 may confirm registration eligibility which may include determining whether the user is eligible to participate in a health care program, whether the user has a valid participating account (e.g., FSA, MSA, HRA, or other consumer-directed account), whether the user is in good standing (e.g., delinquency, etc.) and/or other qualifications.

The card product may be registered with any participating account an employer (or other entity) sets up for the user. In addition, multiple card products may be implemented based on various consumer and/or business needs and/or preferences. Further, multiple participating accounts may be implemented. Participating accounts may include FSAs, HRAs, MSAs, other consumer directed accounts, and/or other accounts. Other participating accounts may also be identified according to the various embodiments of the present invention. In addition, general accounts, not necessarily health care accounts, may also participate in a system of the present invention where eligible transactions may be reimbursed.

Payment Mechanism Module 114 may receive data concerning a user's preferred payment mechanism. Payment mechanism may include a credit card, debit card, savings account, checking account, stored value card, token and/or other mechanism for making a payment. The user may provide payment mechanism identification, which may include a card number and/or other identifier. In addition, the user may also designate multiple payment mechanisms. In this exemplary embodiment, a user may designate one payment mechanism for certain transactions and another payment mechanism for other transactions. For example, the user may designate a primary credit card for transactions under a certain limit (e.g., equal to and less than $20) and a check card for transactions above a certain limit (e.g., over $20). In another example, transactions for nominal amounts (e.g., less than $7) may be applied to another payment mechanism, such as a token, stored value card, etc. Certain payment mechanisms may have more attractive interest rates, bonus arrangements and/or other considerations. In addition, a user may want to categorize certain payments for reimbursement through particular payment mechanisms. For all doctor related visits, a user may designate payment to be made to a debit card while all other transactions may be applied to a regular credit card. In yet another example, transactions at an identified merchant location may be applied to a merchant sponsored credit card while all other transactions are applied to another credit card.

Reimbursement Module 116 may receive data concerning how a user wants to be reimbursed. Reimbursement may be made to a specific account, against a credit card balance, as check or cash, to a retirement account, via payroll and/or other method for reimbursement. For example, as a savings mechanism, a user may designate a retirement account or other savings plan to receive reimbursements payments. In addition, users may designate one or more accounts or one or more reimbursements methods for receiving payments. Further, the user may designate certain reimbursements for one account and other reimbursements for another account. For example, for large reimbursement amounts (e.g., over $50), those reimbursements may be made into a retirement account while smaller amounts (e.g., $50 and under) may be made towards a credit card balance. Other arrangements may be specified, as desired by the user. Reimbursement Module 116 may also confirm that there are sufficient funds in a participating account (e.g., FSA, MSA, HRA or other consumer-directed account) from which funds may be reimbursed.

Eligibility Module 118 may determine whether each transaction or group of transactions is eligible for reimbursement. As payment is already made for the transaction through a designated payment mechanism, a determination of eligibility is performed at module 118. Claim eligibility may refer to determining whether the transaction qualifies for payment. For example, FSA (or other) payment may be restricted for certain types of transactions. For example, if the claim is associated with valid prescription drugs, such as antibiotics for an illness or other infection, the claim may be considered a valid medical expense. However, if the claim is for cosmetic purposes or other enhancements, such as certain anti-aging products, the claim may not be eligible for payment from the consumer-directed account. Each individual expense may be adjudicated against established guidelines (e.g., IRS guidelines) to determine eligibility. In addition, FSA (or other) sponsors, such as employers or Third Party Administrators, may add additional eligibility restrictions based on specific requirements of a particular FSA (or other consumer directed account) program. An employer may also impose additional restrictions for reimbursement. In addition, other restrictions may be applied in determining claim eligibility.

In determining eligibility, an embodiment of the present invention may receive claims data from a merchant entity or other entity from which a transaction has been made. For example, a data feed may be received from merchant 144 which provides information concerning each purchase. Other forms of data may be received and analyzed from other sources, such as credit card company, third party and/or other participant. The information may be used to determine whether each purchase of a transaction is eligible or not. In addition, filters stored in database 130 may be used to identify eligible purchases. Other information may also be accessed.

An embodiment of the present invention may provide real time or batch claim substantiation to validate that a claim is for a valid purpose. Therefore, manual claim submission is unnecessary. Moreover, because authorization may be based on specific transaction-level data, there is no or minimal risk of non-compliance with guidelines (e.g., IRS guidelines) for the types of purchases that may be made through a consumer-directed account.

User Interface 120 may provide a user with access to various data concerning reimbursement of eligible transactions. For the health care accounts that are registered with a user's card product (e.g., a credit card, debit card, etc.), the user may view detailed transaction history, status of reimbursement and/or other information.

Billing Module 122 may manage charges and/or fees associated with various services provided by the embodiments of the present invention. For example, the cost of services may involve a flat fee of $X for a time period (e.g., per month, per quarter, per year, etc.) or a variable amount for a time period. For added convenience, the fee may be billed directly to a designated credit card (or other card product or payment mechanism). The payment may be made periodically, at certain events, or as directed by the user. The user may also have the fee deducted tax-free from the participating account (e.g., FSA, MSA, HRA, or other consumer-directed account). This may be established when the card product is registered or at a later time. Other fee arrangements and payment structures may be realized.

For a credit card application, because payments may be settled through a credit card network, substantiation may or may not be in real-time. As substantiation may not occur in real time, this approach is fundamentally different from stored value, and thus is not subject to stored value's challenges and limitations.

In accordance with an embodiment of the present invention, non-compliant expenses are not made from a participating account, such as an FSA. In the example of a registered credit card, charges may be made to a credit account as a normal credit card transaction. After determining eligibility of each transaction, reimbursement may be made for those transactions that are positively substantiated through the data feed or other source of data or confirmation. As such, there is little or no concern regarding non-compliant reimbursement activity, employee delinquency in receipt submission or other impediment. According to this example, the employee pays the balance on his or her credit card or face the consequences (e.g., interest, adverse credit reporting, etc.). Therefore, the interests of all parties are therefore aligned and compliance is ensured.

Figure 2:
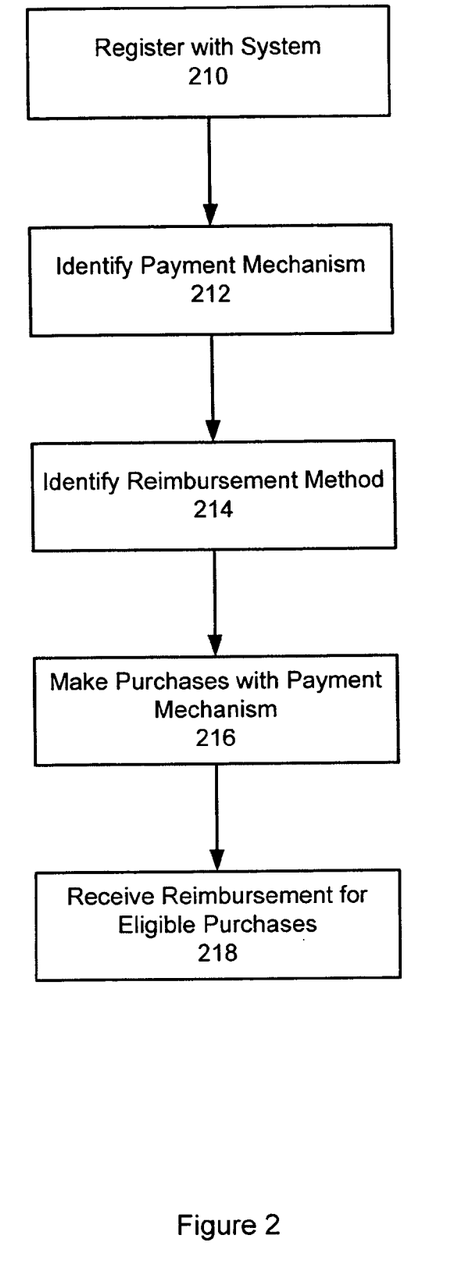
FIG. 2 is an exemplary flowchart of a method for obtaining reimbursements for various transactions, according to an embodiment of the present invention.

FIG. 2 is an exemplary flowchart of a method for obtaining reimbursements for various transactions, according to an embodiment of the present invention. At step 210, a user may register with a system of an embodiment of the present invention. At step 212, the user may identify a payment mechanism. At step 214, the user may identify a reimbursement method. At step 216, the user may make purchases at various locations with the registered payment mechanism. At step 218, the user may receive reimbursement for the eligible purchases. While the process illustrated in FIG. 2 discloses certain steps performed in a particular order, it should be understood that the present invention may be practiced by adding one or more steps to the process, omitting steps within the process and/or altering the order in which one or more steps are performed.

At step 210, a user may register with a system of an embodiment of the present invention. Registration may occur with an employer, human resources department or other registration entity. Registration information may include user identification data, contact data, and/or other information. The user may register in person, online, by phone, by mail or other form of communication.

At step 212, the user may identify a payment mechanism. The payment mechanism may include a credit card, debit card, stored value card, token, checking account, savings account, and/or other manner of making a payment. The user may present the payment mechanism or provide a payment mechanism identifier for online purchases, for example. In addition, multiple payment mechanisms may be identified. Certain conditions may also be defined for triggering a particular payment mechanism. For example, for transactions over an amount may be charged to a credit card and other transactions may be charge to a different payment instrument.

At step 214, the user may identify a reimbursement method. The user may specify one or more methods of reimbursement for one or more identified payment mechanisms. For example, the user may identify reimbursement to a checking account, savings account, retirement fund and/or other account. The user may also specify that reimbursement is made towards a credit card (or other) balance. In addition, predetermined conditions for reimbursement may also be specified. For example, for purchases from a particular merchant (or type of merchant), reimbursement may be made to a user identified account. In another example, reimbursement amounts exceeding a dollar limit may be deposited into a savings account, while reimbursements of smaller value may be sent to the user as a check (e.g., regular check, paycheck, etc.). Other criteria may also be applied.

At step 216, the user may make purchases at various locations with the registered payment mechanism. The user may purchase eligible as well as ineligible services and/or products at various locations. For example, the user may visit a merchant and purchase groceries as well as pharmacy goods all with the registered payment mechanism. After the purchases are made, a system of an embodiment of the present invention may receive data to determine whether each product or service is eligible for reimbursement. Data may be received as a data feed from the merchant or other form of data. In addition, data may be received from a credit card company, third party and/or other participant. The data may identify line item data for each transaction, which may include a plurality of individual purchases. Data may include binary code, or other identifier that may be used to indicate what type of purchase was made. In addition, a system of an embodiment of the present invention may apply filters to the data to determine whether each individual purchase is eligible or not. Other methods for identifying eligible purchases may be applied as well.

At step 218, the user may receive reimbursement for the eligible purchases. Once eligibility determinations have been made to the transactions, the user may receive an authorized reimbursement amount by the identified reimbursement method. In addition, a determination of whether there are sufficient funds for reimbursement may also be made. For example, a user's FSA may have $40 while the eligible reimbursement amount is $50. In this example, a reimbursement of $40 may be made while the remaining $10 is applied to the purchase mechanism. Other arrangements may be applied. Therefore, the user is not required to submit documentation or other forms to verify eligible purchases for reimbursement.

Figure 3:
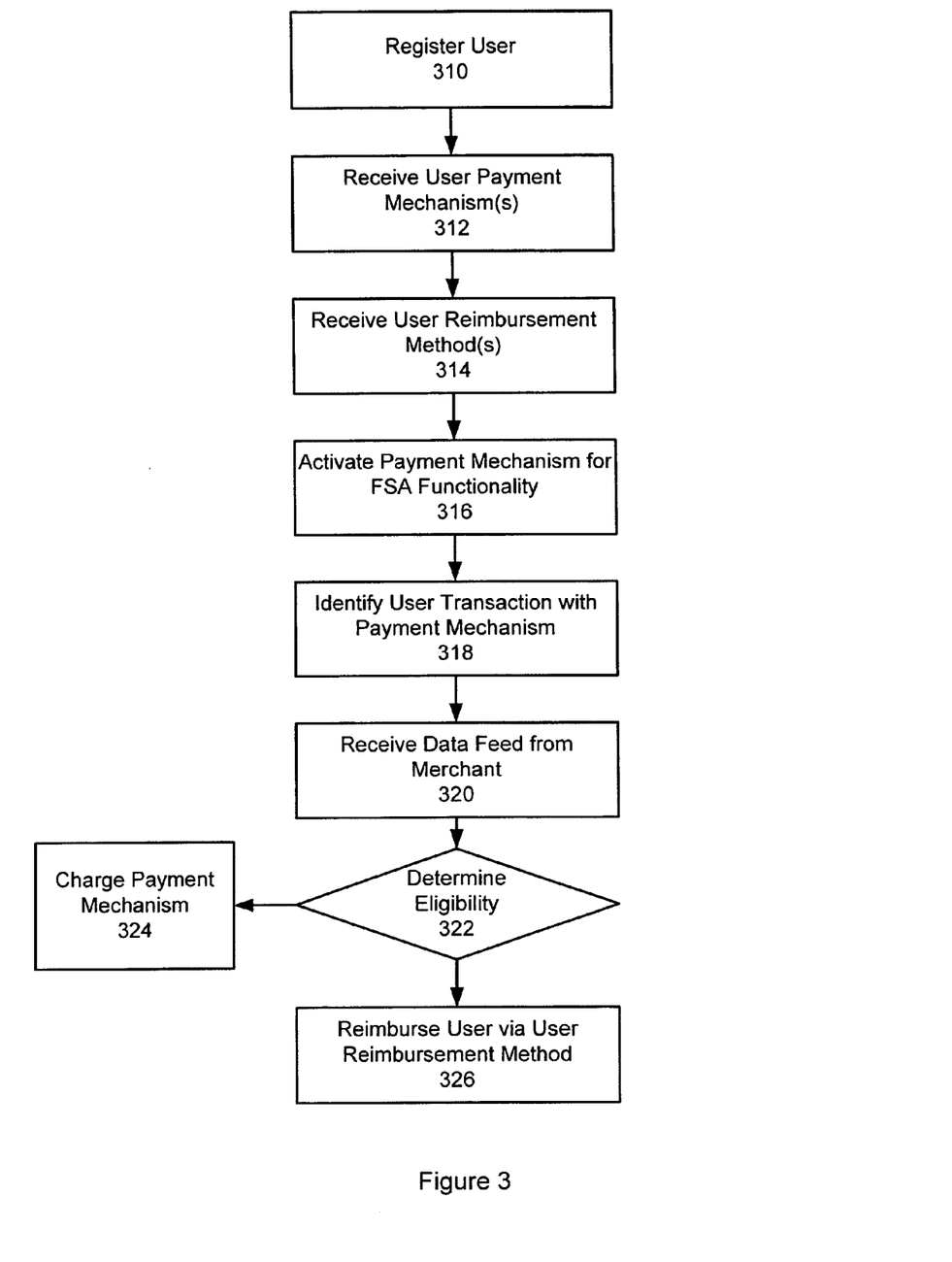
FIG. 3 is an exemplary flowchart of a method for providing reimbursements for various transactions, according to an embodiment of the present invention.

FIG. 3 is an exemplary flowchart of a method for providing reimbursements for various transactions, according to an embodiment of the present invention. At step 310, a system of an embodiment of the present invention may register the user. At step 312, user payment mechanism data may be received. At step 314, user reimbursement method data may be received. At step 316, the payment mechanism may be activated for FSA functionality provided by an embodiment of the present invention. At step 318, a user transaction made with the payment mechanism may be identified. At step 320, data concerning the user transaction may be received from a merchant. At step 322, it may be determined whether one or more expenses from the user transaction is an eligible expense. If not, the expenses may be charged to the regular channels, at step 324. If the expenses are eligible, the user may be reimbursement through the preferred reimbursement method. While the process illustrated in FIG. 3 discloses certain steps performed in a particular order, it should be understood that the present invention may be practiced by adding one or more steps to the process, omitting steps within the process and/or altering the order in which one or more steps are performed.

At step 310, a system of an embodiment of the present invention may register the user. During registration, the user may provide identification data, contact data and other information. Communication between the user and the system may be performed via various modes of communication, including online interface, phone call, mail, electronic communication (e.g., email), wireless phone, etc.

At step 312, user payment mechanism data may be received. User specified payment mechanism data may include card identifier, password/PIN, type of payment mechanism (e.g., VISA™, Mastercard™, etc.), etc. Additional security information may also be collected (e.g., mother's maiden name, social security number, etc.). As discussed above, one or more payment mechanisms may be registered with an embodiment of the present invention. In addition, a participating account may be identified which may include FSA, MSA, HRA, other consumer-directed account and/or other account.

At step 314, user reimbursement method data may be received. As discussed above, the user may specify various reimbursement methods for receiving payment. In addition, reimbursement conditions may also be applied in depositing funds to one or more reimbursement accounts. Further, reimbursement conditions may apply to determine which reimbursement method to use depending on the purchase or transaction. Other specifics may be identified.

At step 316, the payment mechanism may be activated for reimbursement functionality provided by an embodiment of the present invention. After registration, a system of an embodiment of the present invention may enable the registered one or more payment mechanisms for use at various participating merchants and other venues.

At step 318, a user transaction made with the payment mechanism may be identified. When a transaction is made at a participating merchant, a system of an embodiment of the present invention may be notified or alerted. User transaction data may include merchant name, merchant location, time and day of purchase, type of purchase, purchase venue, and/or other data associated with the transaction. Based on relationships and/or other arrangements, data may be received from merchants, credit card companies, third parties and/or other participant.

At step 320, data concerning the user transaction may be received. Transaction data from participating merchants may be received. This data may be received from merchants, credit card companies, third parties and/or other participant. Transaction data may include line item data for identifying each purchase made during each transaction with the registered payment mechanism by the user. The line item data may be used to determine reimbursement eligibility. In another example, the transaction data may be submitted through one or more filters for identifying eligible purchases. Other methods for identifying eligible purchases may be applied as well.

At step 322, it may be determined whether one or more expenses from the user transaction is an eligible expense. If not, the expenses may be charged to the regular channels, at step 324. For example, a user may use a registered credit card to make a transaction at a participating merchant. The transactions may be charged to the credit card. For the purchases that are determined to be eligible, those purchases may be reimbursed through a preferred reimbursement method (e.g., towards the credit card balance, checking account, paycheck, etc.). For the remaining ineligible purchases, these purchases will be charged to the credit card used to make the transactions.

Figure 4:
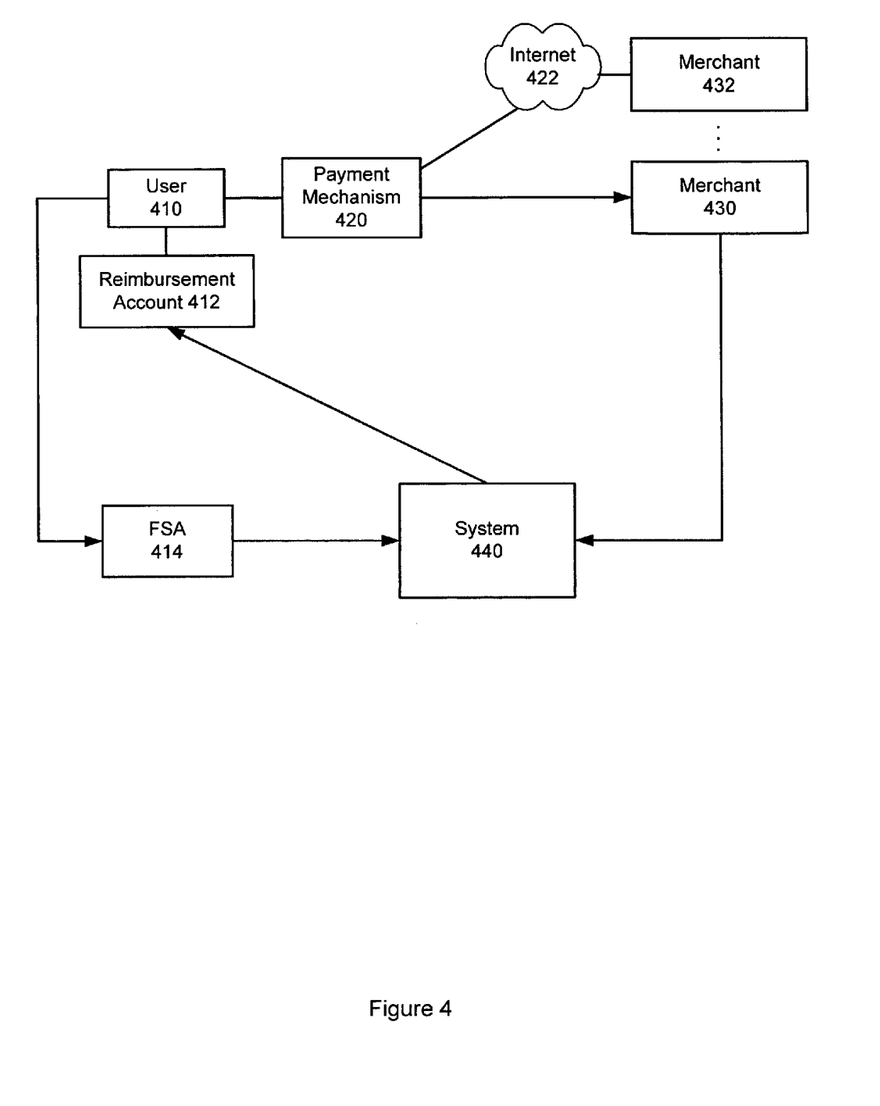
FIG. 4 is an exemplary diagram of a system for facilitating health care reimbursements, according to an embodiment of the present invention.

FIG. 4 is an exemplary diagram of a system for facilitating health care reimbursements, according to an embodiment of the present invention. User 410 may register a payment mechanism 420 with system 440 which provides reimbursement functionality of an embodiment of the present invention. In addition, user 410 may identify an account, such as Reimbursement account 412, to which funds may be deposited. User 410 may also identify a participating account, such as FSA 414, from which reimbursements may be made. In this example, a user may contribute a predetermined amount of pre-taxed dollars from the user's payroll periodically to the participating account, e.g., FSA 414. Other payment mechanisms, reimbursement methods and participating accounts may be identified and applied in accordance with various other scenarios and applications. User 410 may use payment mechanism 420 to make various purchases at merchant locations 430, 432. Purchases may be made via Internet 422 or other venue. Merchant 430 may then forward transaction data that provides line item data. System 440 may use the line item data to determine whether each purchase of the transaction is eligible for reimbursement. Eligibility may be determined using filters, binary codes, data tables, data sets, and/or other method. Funds may be retrieved from a participating account, such as FSA, MSA, HRA, or other consumer-directed account, and reimbursed to the user through a preferred reimbursement method, in this example, to a reimbursement account 412.

Benefits and advantages may be realized by various embodiments of the present invention. For employees, submission of paper receipts and claim forms may be substantially reduced or eliminated, end-of-year forfeitures may be reduced, a need to front cash for payment (credit card float) may be reduced or eliminated, a need to carry a stored value card to enable FSA and HRA automation may be eliminated and attractiveness of FSA and HRA participation may be enhanced. For employers, significant employee benefits at little to no cost may be provided, automated FSA and HRA transactions compliance with plan rules may be enhanced, administrative costs may be reduced and FSA and HRA participation (which may further reduce FICA and lowers plan expenses) may be increased. For Third-Party Administrators, an embodiment of the present invention may differentiate TPA and their competitors, ensure automated FSA and HRA transactions are compliant with plan rules, reduce administrative costs, and increase FSA and HRA participation (e.g., TPA revenues are per-member, per-month, etc.). For participating merchants, advantages may include increased traffic to stores, increased sales volume, enhanced customer loyalty and/or other benefits. Other advantages may be realized for various participants.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

The invention claimed is:

1. A computer implemented method for facilitating healthcare reimbursements for eligible transactions, the computer implemented method comprising the steps of:
    registering a user for reimbursement through an interface wherein the user identifies one or more payment mechanisms and one or more reimbursement methods for healthcare related purchases, prior to a user transaction;
    identifying the user transaction with the one or more payment mechanisms at a merchant wherein the user transaction comprises one or more purchases wherein at least one purchase is related to healthcare;
    receiving merchant data and transaction level data from the merchant regarding the user transaction;
    determining healthcare reimbursement eligibility of the one or more purchases of the user transaction based at least in part on the merchant data and transaction level data; and
    reimbursing the user for one or more eligible healthcare purchases via the one or more reimbursement methods.

2. The method of claim 1, wherein the payment mechanism comprises one or more of a credit card, debit card and token.

3. The method of claim 1, wherein the reimbursement method comprises an electronic deposit in an account.

4. The method of claim 1, wherein the reimbursement method comprises credit against an credit card balance.

5. The method of claim 1, wherein the reimbursement method comprises deposit in an investment account.

6. The method of claim 1, wherein the merchant data comprises line item data of the user transaction.

7. The method of claim 1, wherein the step of determining eligibility comprises applying a filter to the merchant data.

8. The method of claim 7, wherein the filter comprises one or more IRS guidelines.

9. The method of claim 8, wherein the filter comprises additional one or more employer specified guidelines.

10. The method of claim 1, wherein the user transaction comprises ineligible and eligible purchases.

11. The method of claim 10, wherein the ineligible purchases are applied to a payment channel associated with the payment mechanism.

12. The method of claim 1, wherein reimbursement is made from a consumer-directed account.

13. The method of claim 12, wherein the consumer-directed account comprises a Flexible Spending Account associated with the participant wherein the participant designates a predetermined amount of pre-taxed dollars to be deducted from the participant's paycheck and contributed to the participant's consumer-directed account.

14. The method of claim 12, wherein the consumer-directed account comprises a Medical Savings Account associated with the participant.

15. The method of claim 12, wherein the consumer-directed account comprises a Health Reimbursement Arrangement account associated with the participant.

16. A computer implemented method for facilitating healthcare reimbursements for eligible transactions, the computer implemented method comprising the steps of:
   identifying one or more payment mechanisms through an interface of a computer implemented reimbursement system;
   identifying one or more reimbursement methods through the interface of the computer implemented reimbursement system;
   making one or more purchases at a merchant entity with the one or more identified payment mechanisms wherein at least one purchase is related to healthcare; and
   receiving reimbursement for one or more eligible healthcare purchases via the one or more reimbursement methods;
   wherein the step of identifying one or more payment mechanisms and the step of identifying one or more reimbursement methods are performed prior to the step of making one or more purchases.

17. The method of claim 16, wherein the payment mechanism comprises one or more of a credit card, debit card and token.

18. The method of claim 16, wherein the reimbursement method comprises one or more of an electronic deposit in an account, credit against an credit card balance and deposit in an investment account.

19. The method of claim 16, wherein ineligible purchases are applied to a payment channel associated with the payment mechanism.

20. The method of claim 16, wherein reimbursement is made from a consumer-directed account.

21. A computer implemented system for facilitating healthcare reimbursements for eligible transactions, the computer implemented system comprising:
   register module for registering a user for reimbursement wherein the user identifies one or more payment mechanisms and one or more reimbursement methods for healthcare related purchases, prior to a user transaction;
   payment module for identifying the user transaction with the one or more payment mechanisms at a merchant wherein the user transaction comprises one or more purchases and receiving merchant data and transaction level data from the merchant regarding the user transaction wherein at least one purchase is related to healthcare;
   eligibility module for determining healthcare reimbursement eligibility of the one or more purchases of the user transaction based at least in part on the merchant data and transaction level data; and
   reimbursement module for reimbursing the user for one or more eligible healthcare purchases via the one or more reimbursement methods.

22. The system of claim 21, wherein the payment mechanism comprises one or more of a credit card, debit card and token.

23. The system of claim 21, wherein the reimbursement method comprises an electronic deposit in an account.

24. The system of claim 21, wherein the reimbursement method comprises credit against an credit card balance.

25. The system of claim 21, wherein the reimbursement method comprises deposit in an investment account.

26. The system of claim 21, wherein the merchant data comprises line item data of the user transaction.

27. The system of claim 21, wherein a filter is applied to the merchant data.

28. The system of claim 27, wherein the filter comprises one or more IRS guidelines.

29. The system of claim 28, wherein the filter comprises additional one or more employer specified guidelines.

30. The system of claim 21, wherein the user transaction comprises ineligible and eligible purchases.

31. The system of claim 30, wherein the ineligible purchases are applied to a payment channel associated with the payment mechanism.

32. The system of claim 21, wherein reimbursement is made from a consumer-directed account.

33. The system of claim 32, wherein the consumer-directed account comprises a Flexible Spending Account associated with the participant wherein the participant designates a predetermined amount of pre-taxed dollars to be deducted from the participant's paycheck and contributed to the participant's consumer-directed account.

34. The system of claim 32, wherein the consumer-directed account comprises a Medical Savings Account associated with the participant.

35. The system of claim 32, wherein the consumer-directed account comprises a Health Reimbursement Arrangement account associated with the participant.

36. A computer implemented system for facilitating healthcare reimbursements for eligible transactions, the computer implemented system comprising:
   payment module for identifying one or more payment mechanisms with a computer implemented reimbursement system; and
   reimbursement module for identifying one or more reimbursement methods with the computer implemented reimbursement system;
   where the user makes one or more purchases at a merchant entity with the one or more identified payment mechanisms wherein at least one purchase is related to healthcare; and the user receives reimbursement for one or more eligible healthcare purchases via the one or more reimbursement methods; wherein the user identifies one or more payment mechanisms and one or more reimbursement methods prior to making one or more purchases at the merchant entity.

37. The system of claim 36, wherein the payment mechanism comprises one or more of a credit card, debit card and token.

38. The system of claim 36, wherein the reimbursement method comprises one or more of an electronic deposit in an account, credit against an credit card balance and deposit in an investment account.

39. The system of claim 36, wherein ineligible purchases are applied to a payment channel associated with the payment mechanism.

40. The system of claim 36, wherein reimbursement is made from a consumer-directed account.

41. At least one signal embodied in at least one carrier wave for transmitting a computer program of instructions configured to be readable by at least one processor for facilitating healthcare reimbursements for eligible transactions, the computer process comprising:
   registering means for registering a user for reimbursement wherein the user identifies one or more payment mechanisms and one or more reimbursement methods for healthcare related purchases, prior to a user transaction;

identifying means for identifying the user transaction with the one or more payment mechanisms at a merchant wherein the user transaction comprises one or more purchases wherein at least one purchase is related to healthcare;

receiving means for receiving merchant data and transaction level data from the merchant regarding the user transaction;

determining means for determining healthcare reimbursement eligibility of the one or more purchases of the user transaction based at least in part on the merchant data and transaction level data; and reimbursing means for reimbursing the user for one or more eligible healthcare purchases via the one or more reimbursement methods.

42. At least one signal embodied in at least one carrier wave for transmitting a computer program of instructions configured to be readable by at least one processor for facilitating healthcare reimbursements for eligible transactions, the computer process comprising:

identifying means for identifying one or more payment mechanisms with a computer implemented reimbursement system;

identifying means for identifying one or more reimbursement methods with the computer implemented reimbursement system;

means for making one or more purchases at a merchant entity with the one or more identified payment mechanisms wherein at least one purchase is related to healthcare; and receiving means for receiving reimbursement for one or more eligible healthcare purchases via the one or more reimbursement methods;

wherein the user identifies one or more payment mechanisms and one or more reimbursement methods prior to making one or more purchases at the merchant entity.

43. A computer implemented method for facilitating reimbursements for eligible transactions, the computer implemented method comprising the steps of:

registering a user for reimbursement wherein the user identifies one or more payment mechanisms and one or more reimbursement methods, wherein the one or more payment mechanisms comprise one or more of a credit card, debit card and token and wherein the one or more reimbursement methods comprise one or more of an electronic deposit in an account, credit against an credit card balance, and deposit in an investment account;

identifying a user transaction with the one or more payment mechanisms at a merchant wherein the user transaction comprises one or more purchases where the user transaction comprises ineligible and eligible purchases;

receiving merchant data regarding the user transaction, wherein the merchant data comprises line item data of the user transaction;

determining reimbursement eligibility of the one or more purchases of the user transaction based at least in part on the merchant data; and reimbursing the user for eligible purchases via the one or more reimbursement methods;

wherein reimbursement for eligible purchases are made from a consumer-directed account and wherein the ineligible purchases are applied to a payment channel associated with the payment mechanism.

\* \* \* \* \*